Sept. 1, 1925.  
A. MONSEN  
HELICOPTER  
Filed Nov. 6, 1922  
1,551,834  
2 Sheets-Sheet 1
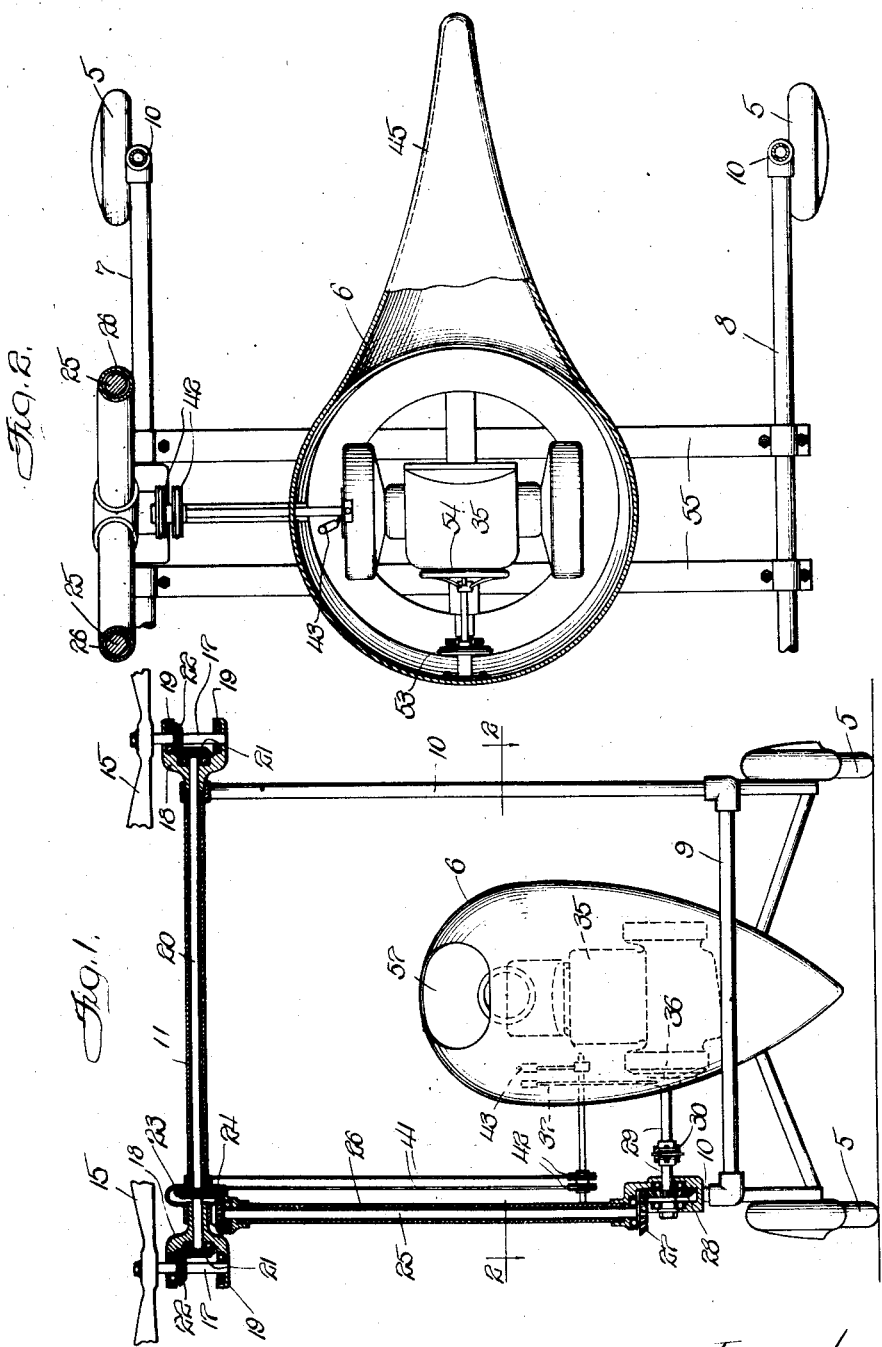

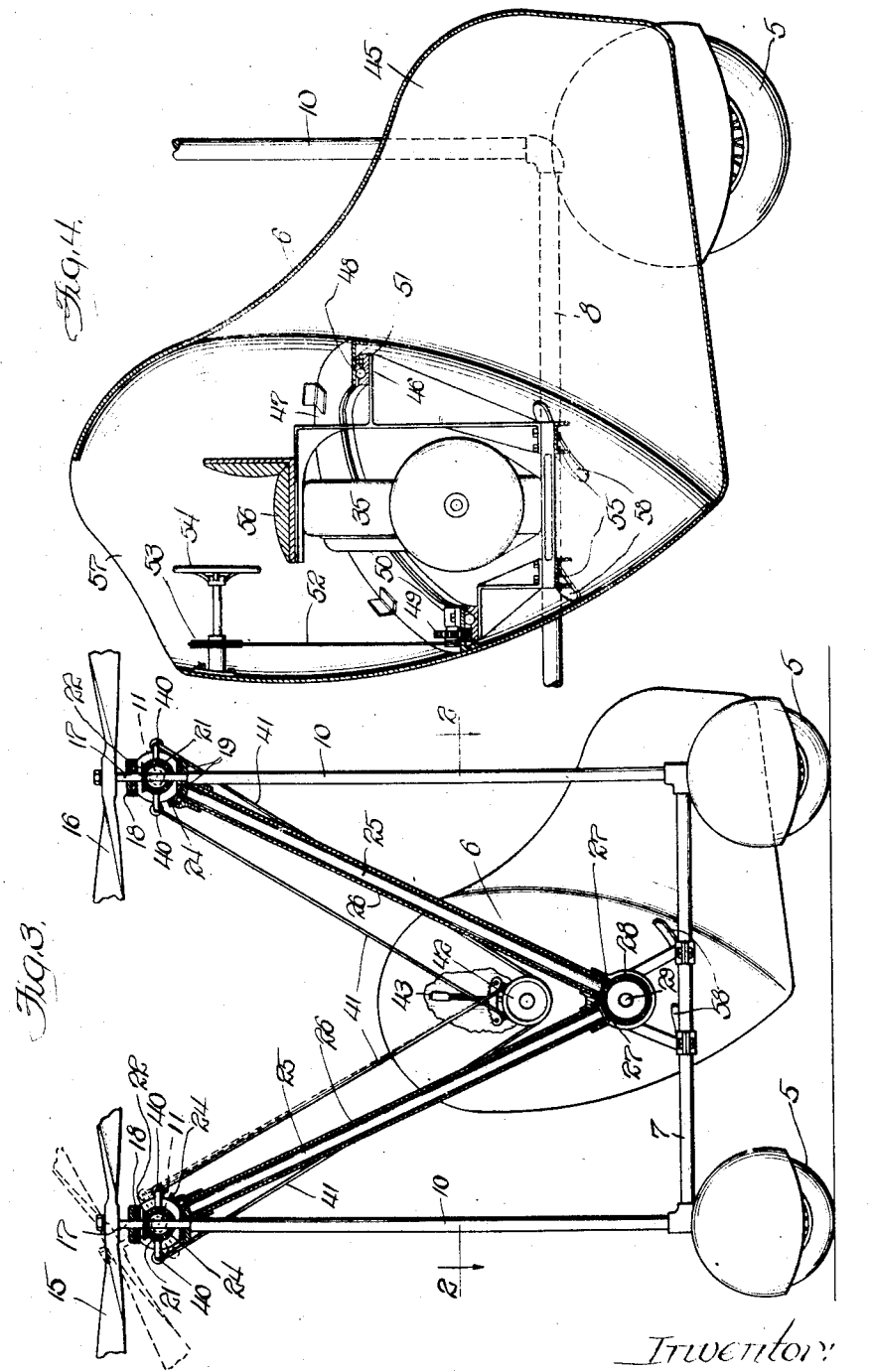

Patented Sept. 1, 1925.

1,551,834

UNITED STATES PATENT OFFICE.

ADOLPH MONSEN, OF LOGANSPORT, INDIANA.

HELICOPTER.

Application filed November 6, 1922. Serial No. 599,235.

*To all whom it may concern:*

Be it known that I, ADOLPH MONSEN, a citizen of the United States, residing at Logansport, in the county of Cass and State of Indiana, have invented certain new and useful Improvements in Helicopters, of which the following is a specification.

This invention relates to helicopters.

One of the objects of the invention is to provide an improved helicopter.

Another object is to provide a helicopter having improved propelling and control mechanism.

Another object is to provide a helicopter wherein the same propellers serve for elevation and advance.

Another object is to provide a helicopter wherein the pilot house body serves as a rudder.

Another object is to provide a helicopter which is simple and reliable.

Other objects and advantages will hereinafter appear.

An embodiment of the invention is illustrated in the accompanying drawings, wherein;

Fig. 1 is a front elevation of the helicopter with some of the operating mechanism in section.

Fig. 2 is an enlarged section on lines 2—2 of Fig. 1.

Fig. 3 is a side elevation with part of the propeller drive and pilot house in section, and;

Fig. 4 is an enlarged vertical section of the pilot house.

The helicopter has a frame work which carries a set of vehicle wheels 5, of which there may be four, and a pilot house 6, within which the motor and controls are located and wherein the operator may sit. The frame work shown has two side members 7 and 8 and a transverse member 9. An upright post 10 is located at each corner of the frame work. Posts 10 are connected together in pairs at the top by cross braces 11. The frame members, braces and posts may be made of metal pipe connected together at their ends by suitable fittings. The fittings which secure braces 11 in place provide journals therefor so that the braces may be rotated as hereinafter set forth.

The helicopter illustrated is provided with four propellers mounted in pairs, two fore and two aft. The forward pair of propellers 15 are mounted near the upper ends of front posts 10 and the rear pair of propellers 16 are mounted near the upper ends of rear posts 10. Each propeller is carried by a short shaft 17 which is journaled in a bracket 18. Brackets 18 may be provided with suitable ball bearings 19 for shafts 17. Brackets 18 for each pair of propellers are rigidly secured to the ends of a corresponding brace 11 so as to turn therewith.

A countershaft 20 is housed within each brace 11. A bevel pinion 21 is rigidly mounted on each end of each shaft 20. Pinions 21 on each shaft engage lever pinions 22 secured to shaft 17 of the corresponding propellers. Each shaft 11 is provided with a bevel pinion 23 secured thereto. Pinions 23 mesh with a pair of bevel pinions 24. Pinions 24 are secured to the upper ends of two driven shafts 25. Shafts 25 are housed in pipes 26 and carry pinions 27 at their lower ends. Pinions 27 mesh with bevel pinions 28 which are secured to a main shaft 29. Shaft 29 may be made in two parts interconnected by a suitable coupling 30. Main shaft 29 may be connected to and disconnected from the shaft of an engine 35 by a suitable clutch 36. Clutch 36 is operated by a lever 37 and may be of the well known type which will lock or grip the driven shaft against rotation when the same is disconnected from the driving shaft.

Thus the engine of the helicopter rotates both pairs of propellers. The direction of rotation may be changed for any propeller, if desired, by changing the position of its pinion 22 from engagement with the upper side of pinion 21 into engagement with the lower side thereof. The rotation of the propellers provides the necessary lift for raising the helicopter. The same propellers also serve to advance the helicopter.

As previously described, each pair of propellers is mounted on brackets 18 which are journaled to the framework. Thus each pair of propellers may be tilted about the axis of the shaft 20 in either a forward or backward direction, as shown by the dotted lines in Fig. 3. Each brace 11 has a pair of arms 40 secured thereto. Arms 40 have cables 41 secured thereto. Cables 41 pass around pulleys 42 and are adapted to be wound thereon by the manipulation of an operator's lever 43. Thus when lever 43 is moved in one direction both pairs of propellers are tilted about their axis, either forward or backward. When the lever is moved in the other direction the pairs of propellers are tilted in a reverse direction. The engine rotates the propellers in whatever angular position they may be.

To steer the helicopter the pilot house is extended rearwardly to provide a rudder 45. A supporting, circular track 46 is rigidly carried by the framework. A companion circular track 47 is rigidly secured to the inside of the walls of the pilot house. Suitable anti-friction bearings 48 may be interposed between tracks 46 and 47. A gear wheel 49 is journaled in a bearing 50 which is secured to the track 47 and extends through a slot in the track to engage the teeth of an annular rack 51, forming a part of track 46. Gear wheel 49 is rotated by a cable 52, which passes over a pulley 53 carried by the pilot house and operable by a steering wheel 54. Thus the rotation of the steering wheel in one direction or the other rotates the gear wheel 49 in the corresponding direction. The rotation of gear wheel 49 causes the same to travel over rack 51 and since rack 51 is stationary relative to the frame work and track 47 is stationary relative to the pilot house, the pilot house is moved in one direction or the other. Preferably pilot house supporting track 46 is positioned at an angle to the horizontal, the rear end being higher than the forward end. This arrangement allows the pilot house to swing on a diagonal from side to side and assists the elevating and steering.

When the helicopter is elevated and power is removed from the propeller by the operation of clutch lever 37 the propellers are locked against rotation and act somewhat like a parachute to insure a gradual descent.

Engine 35 and pilot house supporting track 46 are supported upon a pair of cross braces 55. Braces 55 also carry a seat 56 for the operator. An opening 57 in the pilot house serves for exit and entrance thereto and as a window for the operator. Slots 58 in the pilot house and similar slots for shaft 29 and operator's lever 43 permit the pilot house to be moved relative to the framework, engine and seat.

Having described my invention what I claim as new and desire to secure by Letters Patent, is:—

1. A helicopter comprising a framework, a propeller carried thereby, and a pilot house carried by the framework and bodily rotatable relatively to said frame to serve as a rudder.

2. A helicopter comprising a framework, a curved supporting track carried thereby, a pilot house, a track secured to the pilot house and movably supported by the supporting track, means for causing relative movement between the two tracks to move the pilot house, and a propeller for raising the helicopter.

In testimony whereof I hereunto subscribed my name.

ADOLPH MONSEN.